United States Patent
Sung et al.

(10) Patent No.: US 12,134,433 B2
(45) Date of Patent: Nov. 5, 2024

(54) VEHICLE AND CONTROL METHOD THEREOF

(71) Applicants: Hyundai Motor Company, Seoul (KR); Kia Corporation, Seoul (KR)

(72) Inventors: You Chei Sung, Seongnam-si (KR); Sangpil Kim, Gwangmyeong-si (KR); Kiseok Seong, Cheonan-si (KR); Young Deok Won, Yongin-si (KR); Jeongkyu Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 247 days.

(21) Appl. No.: 17/857,463

(22) Filed: Jul. 5, 2022

(65) Prior Publication Data

US 2023/0011158 A1    Jan. 12, 2023

(30) Foreign Application Priority Data

Jul. 7, 2021    (KR) .................. 10-2021-0089208

(51) Int. Cl.
| | |
|---|---|
| *B62D 6/04* | (2006.01) |
| *B62D 15/02* | (2006.01) |
| *G06V 20/56* | (2022.01) |
| *G06V 20/58* | (2022.01) |

(52) U.S. Cl.
CPC ............. *B62D 6/04* (2013.01); *B62D 15/025* (2013.01); *G06V 20/58* (2022.01); *G06V 20/588* (2022.01); *B60Y 2400/304* (2013.01)

(58) Field of Classification Search
CPC .. B60W 40/076; B60Y 2400/304; B62D 6/04; G06V 20/58; G06V 20/588
See application file for complete search history.

(56) References Cited

U.S. PATENT DOCUMENTS

2018/0154902 A1*    6/2018    Shami .................. B60W 10/18

FOREIGN PATENT DOCUMENTS

| CN | 110751012 A | * | 2/2020 | ......... G06K 9/00671 |
|---|---|---|---|---|
| KR | 20170035206 A | | 3/2017 | |

OTHER PUBLICATIONS

Che, CN 110751012 A, machine translation. (Year: 2020).*

* cited by examiner

*Primary Examiner* — Hung Q Nguyen
*Assistant Examiner* — Mark L. Greene
(74) *Attorney, Agent, or Firm* — Slater Matsil, LLP

(57) ABSTRACT

An embodiment vehicle includes a camera installed in the vehicle to have a front view of the vehicle, a steering device, and a processor configured to determine whether a road has an inclination in a transverse direction based on image data obtained by the camera and to control the steering device to compensate for the inclination in the transverse direction in response to a determination that the road has the inclination in the transverse direction.

20 Claims, 10 Drawing Sheets

VEHICLE AND CONTROL METHOD THEREOF

CROSS-REFERENCE TO RELATED APPLICATIONS

This application claims the benefit of Korean Patent Application No. 10-2021-0089208, filed on Jul. 7, 2021, which application is hereby incorporated herein by reference.

TECHNICAL FIELD

The disclosure relates to a vehicle and a control method thereof.

BACKGROUND

Vehicles are the most common means of transportation in modern society, and the number of people using vehicles is increasing. With the development of vehicle technology, there are advantages such as ease of long-distance movement and convenience of life, but in places with high population density, such as Korea, road traffic conditions worsen and traffic congestion becomes serious frequently.

Recently, research on a vehicle equipped with an advanced driver assistance system (ADAS) that actively provides information about a vehicle state, a driver state, and/or surrounding environment has been actively conducted in order to reduce a driver's burden and enhance convenience.

As an example of the advanced driver assistance system mounted on a vehicle, there are a lane departure warning (LDW), a lane keeping assist (LKA), a high beam assist (HBA), an automatic emergency braking (AEB), a traffic sign recognition (TSR), an adaptive cruise control (ACC), or a blind spot detection (BSD), and the like.

The driver assistance system may collect information about the surrounding environment and process the collected information. Also, the driver assistance system may recognize an object and design a path for a vehicle to travel based on a result of processing the collected information.

However, in preventing departure from a lane, maintaining the center of a lane, or driving in a lane using lane information, the performance of a conventional driver assistance system may be deteriorated when a leaning phenomenon of a vehicle occurs due to a lateral acceleration caused by an inclination of a road.

SUMMARY

The disclosure relates to a vehicle and a control method thereof. Particular embodiments relate to an apparatus for assisting driving of a vehicle capable of detecting inclination of the vehicle and a control method thereof.

An embodiment of the disclosure provides a vehicle capable of improving a leaning phenomenon caused by an inclination of a lane in a transverse direction and a control method thereof.

Additional embodiments of the disclosure will be set forth in part in the description which follows and, in part, will be obvious from the description, or may be learned by practice of the disclosure.

In accordance with an embodiment of the disclosure, a vehicle includes a camera installed in the vehicle to have a front view of the vehicle and obtain image data, a steering device, and a processor configured to identify whether a road is inclined in a transverse direction based on the image data and to control the steering device to compensate for the inclination in the transverse direction based on the identification of the inclination in the transverse direction.

The processor may be configured to identify an object larger than or equal to a predetermined size based on the image data and identify whether the road is inclined in the transverse direction based on the identification of the object.

The processor may be configured to identify at least one object and identify the at least one inclination of the road in the transverse direction based on the identified at least one object, and to impart a weight to the identified at least one inclination in the transverse direction depending on a size of the identified at least one object and identify the inclination of the road in the transverse direction based on the at least one weight and the inclination in the transverse direction.

The processor may be configured to identify the object when a distance between the vehicle and the object is farther than a reference distance.

The processor may be configured to control the steering device to vary a degree of compensating for the inclination of the road in the transverse direction based on the sum of the weights imparted to the identified objects.

The camera may be provided to further have a rear view of the vehicle.

The vehicle may further include a sensor installed in the vehicle to generate acceleration information, wherein the processor may be configured to control the steering device to compensate for the inclination of the road in the transverse direction based on the acceleration information and the identified inclination in the transverse direction.

The processor may be configured to identify the object when a distance between the vehicle and the object is closer than a reference distance.

In accordance with an embodiment of the disclosure, a control method of a vehicle includes obtaining image data by a camera installed in the vehicle to have a front view of the vehicle, identifying whether a road is inclined in a transverse direction based on the image data, and controlling a steering device to compensate for the inclination in the transverse direction based on the identification of the inclination in the transverse direction.

In accordance with an embodiment of the disclosure, a driver assistance device includes a camera installed in a vehicle to have a front view of the vehicle and obtain image data, and a processor provided to process the image data, wherein the processor is configured to identify whether a road is inclined in a transverse direction based on the image data and to control the steering device to compensate for the inclination in the transverse direction based on the identification of the inclination in the transverse direction.

BRIEF DESCRIPTION OF THE DRAWINGS

These and/or other features of embodiments of the disclosure will become apparent and more readily appreciated from the following description of the exemplary embodiments, taken in conjunction with the accompanying drawings, in which.

DETAILED DESCRIPTION OF ILLUSTRATIVE EMBODIMENTS

Throughout the specification, like reference numerals refer to like elements. This specification does not describe all the elements of the embodiments, and duplicative contents between general contents or embodiments in the technical field of the disclosure will be omitted.

Throughout the specification, when a part is referred to as being "connected" to another part, it includes not only a direct connection but also an indirect connection, and the indirect connection includes connecting through a wireless network.

When it is described that a part "includes" an element, it means that the element may further include other elements, not excluding the other elements unless specifically stated otherwise.

The singular forms "a," "an," and "the" include plural referents unless the context clearly dictates otherwise.

In addition, terms such as "~unit", "~part," "~block," "~member," "~module," and the like may denote a unit for processing at least one function or operation. For example, the terms may refer to at least one hardware such as a field-programmable gate array (FPGA)/an application specific integrated circuit (ASIC), at least one software stored in a memory, or at least one process processed by a processor.

Reference numerals used in operations are provided for convenience of description, without describing the order of the operations, and the operations may be executed in a different order from the stated order unless a specific order is definitely specified in the context.

The terms 'first,' 'second,' etc. are used to distinguish one element from another element, and the elements are not limited by the above-mentioned terms.

Hereinafter, embodiments of the disclosure will be described in detail with reference to the accompanying drawings.

Figure 1:
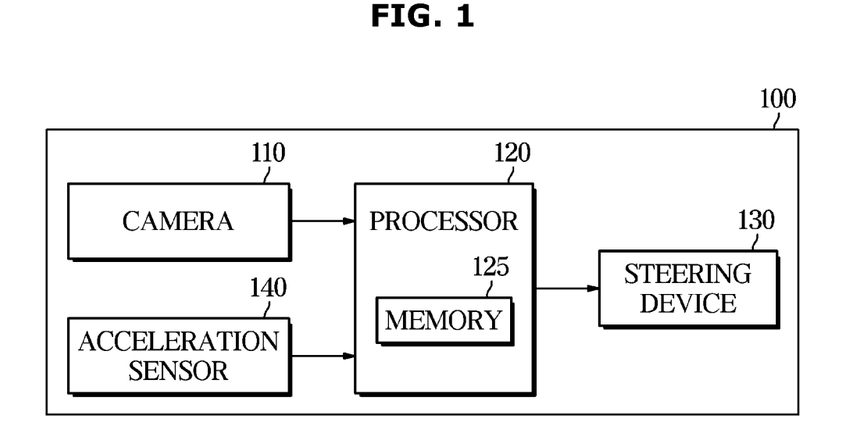
FIG. 1 is a block diagram illustrating a configuration of a vehicle according to an embodiment.
Figure 2A:
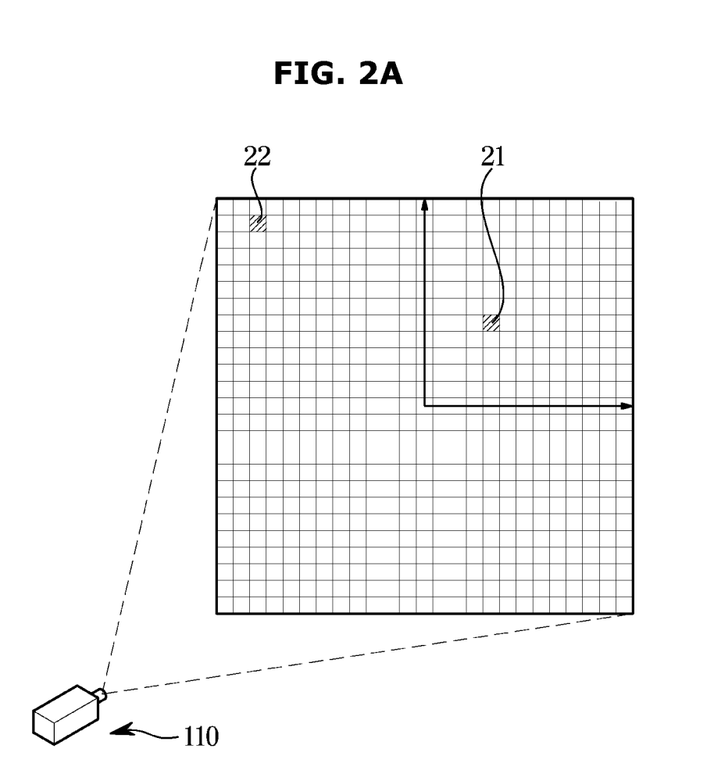
FIG. 2A is a view for explaining a correction plate set to correct image data captured by a camera included in the vehicle according to an embodiment.
Figure 2B:
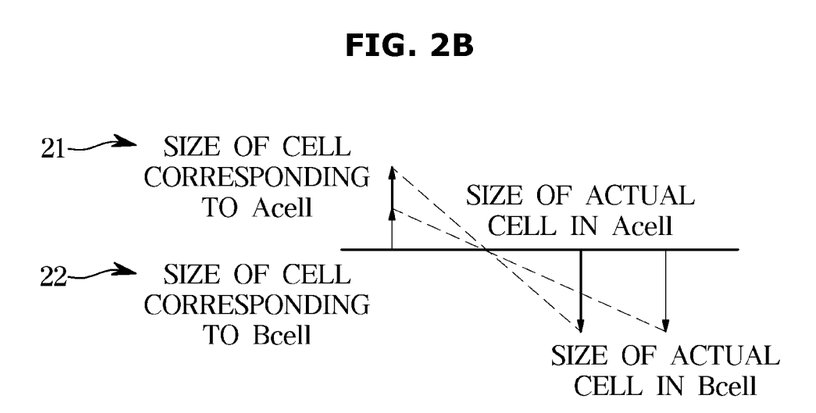
FIG. 2B is a diagram for explaining an image correction principle according to an embodiment.
Figure 2C:
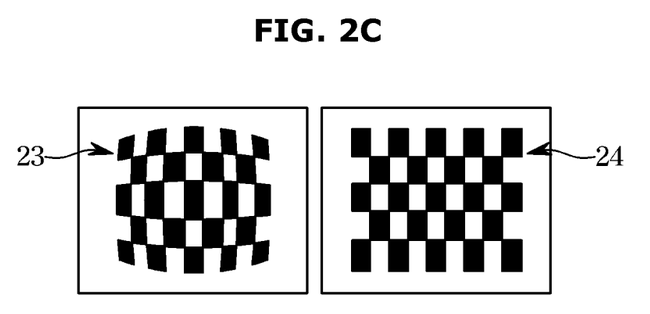
FIG. 2C is a conceptual diagram illustrating before and after correction of the image data captured by the camera included in the vehicle according to an embodiment.

FIG. 1 is a block diagram illustrating a configuration of a vehicle 100 according to an embodiment. FIG. 2A is a view for explaining a correction plate set to correct image data captured by a camera included in the vehicle according to an embodiment. FIG. 2B is a diagram for explaining an image correction principle according to an embodiment. FIG. 2C is a conceptual diagram illustrating before and after correction of the image data captured by the camera included in the vehicle according to an embodiment.

Referring to FIGS. 1, 2A, 2B, and 2C, the vehicle 100 may include a camera 110, a processor 120, a steering device 130, and an acceleration sensor 140. These devices may communicate with each other via a vehicle communication network. For example, the electric devices 110, 120, 130, and 140 included in the vehicle 100 may send and receive data through Ethernet, MOST (Media Oriented Systems Transport), Flexray, CAN (Controller Area Network), LIN (Local Interconnect Network), and the like. However, the disclosure is not limited thereto.

The camera 110 may be installed to have a front view from the vehicle 100 to photograph from the front of the vehicle 100 and obtain image data from the front of the vehicle 100. Also, the camera 110 may be installed to have a rear view from the vehicle 100 to obtain image data from the rear of the vehicle 100. In other words, the camera 110 may include at least one of a first camera installed to have the front view from the vehicle 100 and a second camera installed to have the rear view from the vehicle 100.

The image data may include information on various objects in the front or rear of the vehicle 100. The objects may include, for example, a building, a vehicle, a horizon, a street lamp, a tree, and the like, but is not limited thereto.

The camera 110 may include a plurality of lenses and an image sensor. The image sensor may include a plurality of photodiodes converting light into an electrical signal, and the plurality of photodiodes may be arranged in a two-dimensional matrix.

The image data captured by the camera 110 may be distorted depending on perspective due to a distance between the camera 110 of the vehicle 100 and an object (subject, etc.). Such distortion may be severe as the camera 110 has a wide angle view, the lens of the camera 110 is closer to the subject (object), or is further away from the subject.

More specifically, referring to FIGS. 2A and 2B, when two arbitrary unit coordinates of the image data captured by the camera are expressed as an Xcell 21 and a Ycell 22, respectively, it may be seen that a distance between the Xcell 21 and the camera 110 is farther than a distance between the Ycell 22 and the camera 110 in 3D spatial coordinates. That is, although sizes of the Xcell 21 and the Ycell 22 are actually the same, the sizes of the Xcell 21 and the Ycell 22 expressed in the image data captured depending on distortion due to perspective may be distorted and expressed differently.

The camera 110 may include a graphic processor to process image data, and the graphic processor may correct image distortion depending on perspective. Referring to FIG. 2C, an image data 23 before correction may have a smaller size (e.g., area, etc.) of an image unit as the distance between the object and the camera 110 increases. Compared with the above, referring to an image data 24 after correction, the graphic processor may correct distortion caused by perspective. More specifically, the graphic processor corresponds unit coordinates of the image data 23 before correction captured by the camera 110 to actual unit coordinates one-to-one, so that the image data may be reset to fit the actual vertical and horizontal. However, the disclosure is not limited thereto.

As another embodiment, the graphic processor of the camera 110 may not only correct perspective distortion by the above-described image data correction, but also a conventionally known perspective distortion technique may be applied and a perspective distortion technique to be developed in the future may be applied.

The processor 120 may include a memory 125 in which the processor 120 may store a program and/or data for processing image data. The memory 125 may also store a program and/or data for the processor 120 to generate a steering signal.

The processor 120 may also include an image processor for processing the image data of the camera 110, a signal processor for processing a signal of the acceleration sensor 140, which will be described later, or a micro control unit (MCU) for generating a steering signal.

The processor 120 may identify whether a load is inclined in the transverse direction based on the image data captured by the camera 110. More specifically, the processor 120 may identify whether a load is inclined in the transverse direction based on the image data after the camera 110 corrects for distortion due to perspective.

The memory 125 may temporarily store image data received from the camera 110, acceleration information received from the acceleration sensor 140, and a steering signal of the steering device 130, and may temporarily store processing results of the image data of the processor 120, the acceleration information, and the like.

Also, the memory 125 may store, for example, an object identification model learned by inputting image data related to driving of a vehicle into an artificial intelligence algorithm. However, the disclosure is not limited thereto, and the memory 125 may continuously update the object identification model from an external server (not shown).

The object identification model may be a model in which the processor 120 outputs the object identified by inputting image data captured by the camera 110 in order to identify the inclination of a road in the transverse direction. That is, an algorithm for the processor 120 to identify an object may be similarly learned and applied in the object identification model.

That is, the object identification model may be an artificial intelligence model learned to output information for identifying an object included in the image data in a manner in which the image data captured by the camera 110 is input to an artificial intelligence algorithm. In this case, the processor 120 may output only the object learned by inputting the image data to the object identification model. That is, in identifying an inclination of a road in the transverse direction, the processor 120 may identify only objects with a high stability and reliability, such as a building, a ground, a horizon, and the like. However, the disclosure is not limited thereto.

For example, a conventionally known machine learning algorithm including unsupervised learning, reinforcement learning, and supervised learning, or a machine learning algorithm to be developed in the future may be applied to the object identification model.

The memory 125 may include not only a volatile memory such as an SRAM and a DRAM, but also a non-volatile memory such as a flash memory, a read-only memory (ROM), and an erasable programmable read-only memory (EPROM), but it is not limited thereto.

The processor 120 may detect an object existing at the front or rear of the vehicle 100 based on the image data. The camera 110 may generate a track representing an object using, for example, image processing and classify the track. For example, the camera 110 may identify whether the track is another vehicle, a building, a horizon, a street lamp, or the like.

The processor 120 may generate a control signal for controlling the steering device 130. The control signal for controlling the steering device 130 generated by the processor 120 may be, for example, a signal for generating a torque of the steering device 130 to change a path of the vehicle 100. However, the disclosure is not limited thereto.

The steering device 130 may include an electronic power steering control module (EPS). The steering device 130 may change a driving direction of the vehicle 100, and the electronic power steering control module may assist an operation of the steering device 130 so that the driver may easily manipulate a steering wheel in response to a steering intention of the driver through the steering wheel. Also, the electronic power steering control module may control the steering device 130 in response to a request from the processor 120. For example, the electronic power steering control module may receive a steering request including a steering torque from the processor 120 and control the steering device 130 to steer the vehicle 100 based on the requested steering torque.

The acceleration sensor 140 may obtain information on an acceleration and/or an angular velocity of the vehicle 100. For example, the acceleration sensor 140 may obtain acceleration information of the vehicle 100 in the transverse direction and acceleration information of the vehicle 100 in a longitudinal direction. However, the disclosure is not limited thereto, As another embodiment, the vehicle 100 may further include sensors for detecting the movement of the vehicle 100. For example, the vehicle 100 may further include a vehicle speed sensor for detecting a longitudinal speed of the vehicle 100, a gyro sensor for detecting a yaw angular speed, a roll angular speed, and a pitch angular speed, and the like.

Figure 3:
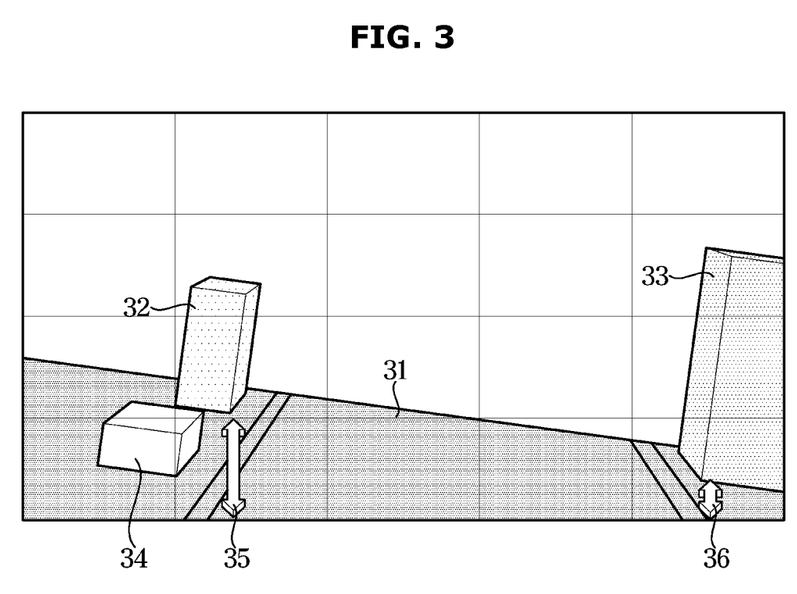
FIG. 3 is a first conceptual diagram illustrating an example for explaining image processing of a processor for objects in a long distance of the vehicle according to an embodiment.

FIG. 3 is a first conceptual diagram illustrating an example for explaining image processing of the processor 120 for objects in a long distance of the vehicle 100 according to an embodiment.

The processor 120 may identify a distance between an object and the vehicle 100 that is included in image data based on the image data. However, the disclosure is not limited thereto. As another embodiment, the processor 120 may identify a distance between an object and the vehicle 100 based on an output signal of a radar or lidar included in the vehicle 100.

The processor 120 may identify objects having a size larger than or equal to a predetermined size among objects included in image data based on the image data captured by the camera 110. Also, the processor 120 may identify an object when the distance between the vehicle 100 and the object is farther than a reference distance. For example, the processor 120 may identify an object by at least one of the identification of an object when the distance between the vehicle 100 and the object included in image data is farther than the reference distance and the identification of an object when a size of the object included in the image data is larger than or equal to the predetermined size.

Referring to FIG. 3, the processor 120 may identify a first object 31, a second object 32, and a third object 33 corresponding to the predetermined size or more among the first object 31, the second object 32, the third object 33, and a fourth object 34 that are included in image data. The determined size may refer to, for example, a reference value for an area (size, etc.) occupied by an object in image data, and may be for reliability of object recognition. For example, the predetermined size may be a size sufficient to calculate a straight line component of an object perpendicular to the ground in order to calculate an inclination of the vehicle 100 in the transverse direction, which will be described later, but it is not limited thereto.

The processor 120 may identify an object when the distance between the vehicle 100 and the object is farther than the reference distance. Referring to FIG. 3, for example, because a distance 35 between the second object 32 and the vehicle 100 and a distance 36 between the third object 33 and the vehicle 100 are farther than the reference distance, the processor 120 may identify the second object 32 and the third object 33.

When the processor 120 identifies an object at a distance farther than the reference distance, for example, an object at a short distance may be a building, but when the processor 120 identifies another vehicle (not shown) at a short distance, the processor 120 identifies an inclination in a front transverse direction, so that noise is generated when an inclination of the current road in the transverse direction is calculated.

Accordingly, the criterion of the reference distance identified by the processor 120 may be, for example, an arbitrary distance set so that the processor 120 may not identify a vehicle existing in a short distance. However, the disclosure is not limited thereto.

Figure 4:
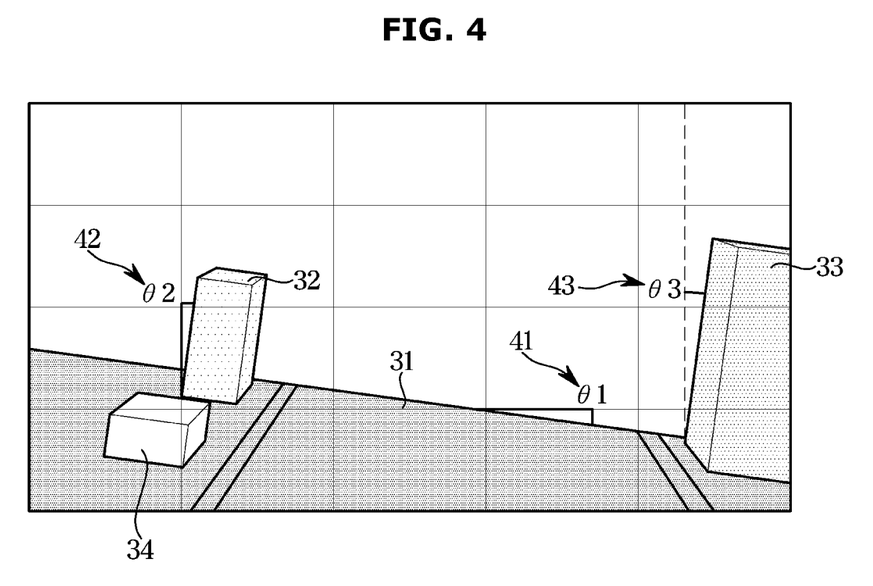
FIG. 4 is a second conceptual diagram illustrating an example for explaining image processing of the processor for the objects in the long distance of the vehicle according to an embodiment.

FIG. 4 is a second conceptual diagram illustrating an example for explaining image processing by the processor 120 for the objects in the long distance of the vehicle 100 according to an embodiment.

The processor 120 according to an embodiment may identify an inclination of a road in the transverse direction based on the identified object. More specifically, the processor 120 may extract an element perpendicular to the ground 31 from the identified object. Also, the processor 120 may calculate an angle between the perpendicular element and a vertical or horizontal element of the reference coordinate system of the image data. The calculated angle may be, for example, a degree of inclination (angle) of the road in the transverse direction.

As illustrated FIG. 4, for example, when the processor 120 identifies the ground 31, the second object 32, and the third object 33 based on the image data, the processor 120 may calculate an angle Θ1 between the horizontal element of the reference coordinate system of the image data and the ground 31, an angle Θ2 between the vertical element of the reference coordinate system of the image data and an element of the second object 32 perpendicular to the ground 31, and an angle Θ3 between the vertical element of the reference coordinate system of the image data and an element of the third object 33 perpendicular to the ground 31. The respective angles Θ1 to Θ3 may be the same, but an error may occur depending on the clarity of the image data, the shaking of the vehicle 100, and the like.

Accordingly, in order to improve reliability and stability for inclination in the transverse direction, the processor 120 may identify the inclination in the transverse direction by imparting a weight depending on a size of the identified reference object.

The processor 120 according to an embodiment may identify the inclination in the transverse direction through Equation 1 below.

$$\theta_{Total} = \frac{\theta_1 C_1 + \theta_2 C_2 + \theta_3 C_3 + \ldots + \theta_n C_n}{C_1 + C_2 + C_3 + \ldots + C_n} \qquad \text{Equation 1}$$

The sign $\Theta_{total}$ in Equation 1 is the inclination of the road in the transverse direction that is finally identified (calculated, etc.), $\Theta_n$ is an inclination in the transverse direction calculated in an n-th object, and $C_n$ may be a weight imparted to the n-th object.

More specifically, as illustrated in FIG. 4, because the ground 31, which is an object identified by the processor 120, has the largest size among the objects 31, 32 and 33 included in the image data, a weight of C1 may be imparted to the ground 31, a weight of C2 may be imparted to the second object 32, and a weight of C3 may be imparted to the third object 33. Herein, because when the ground 31, the second object 32, and the third object 33 are enumerated in the order of having a large area among the image data, it may be enumerated as the order of the ground 31, the third object 33, and the second object 32, it may be understood that a magnitude of the weight is imparted as C1>C3>C2. In this case, the calculated inclination in the transverse direction may be $$\frac{\theta_1 C_1 + \theta_2 C_2 + \theta_3 C_3}{C_1 + C_2 + C_3}.$$

However, the disclosure is not limited thereto.

The processor 120 may control the steering device 130 based on the identified inclination in the transverse direction. More specifically, the processor 120 generates a compensation torque based on the inclination of the road in the transverse direction with respect to a final steering torque of the steering device 130 generated by the driver assistance system including a road departure prevention assistance function or a road maintenance assistance function of the vehicle 100, generates a control signal for the torque, and transmits the control signal to the steering device 130, so that a phenomenon in which the vehicle 100 is leaned due to the inclination in the transverse direction may be prevented or improved.

For reliability and stability of the compensation torque when the number of objects identified from the image data is small, the processor 120 according to an embodiment may vary a degree of the compensation torque included in the control signal of the steering device 130 depending on the sum of weights imparted depending on the size of the identified object.

That is, the smaller the number of objects identified by the processor 120 from the image data and the smaller the size of the objects, the reliability and stability for the calculated inclination in the transverse direction are lower than when the number of objects is large or the size of objects is large. Therefore, in order to secure the reliability and stability, the processor 120 may control the steering device 130 to vary a degree of compensating for the inclination in the transverse direction based on the sum of the weights imparted to the identified objects.

For example, because the processor 120 does not impart a weight when an object identified by the processor 120 from the image data does not exist, there may be no compensation torque for the steering device 130. However, the disclosure is not limited thereto.

As another embodiment, when the compensation torque depending on the inclination in the transverse direction identified by the processor 120 is Ga and the sum of the weights imparted to the identified objects is greater than a preset value, the processor 120 may control the steering device 130 to fully apply the compensation torque Ga.

In addition, when the compensation torque depending on the inclination in the transverse direction identified by the processor 120 according to an embodiment is Ga, and when the sum of the weights imparted to the identified objects is less than the preset value but greater than 0, the processor 120 may calculate a compensation torque to be applied as shown in Equation 2 below.

$$Fa(c) = p * Ga * \frac{C_{total}}{K} \qquad \text{Equation 2}$$

The sign Fa(c) in Equation 2 is a final compensation torque, p is a proportionality constant, Ga is the compensation torque calculated based on the inclination of the identified (calculated, etc.) road in the transverse direction, $C_{total}$ is the sum of the weights, and K may be a preset value.

When the sum of the weights imparted to the identified objects is smaller than the preset value, the processor 120 may vary the magnitude of the torque compensated for the steering device 130 depending on the sum of the weights.

Figure 5:
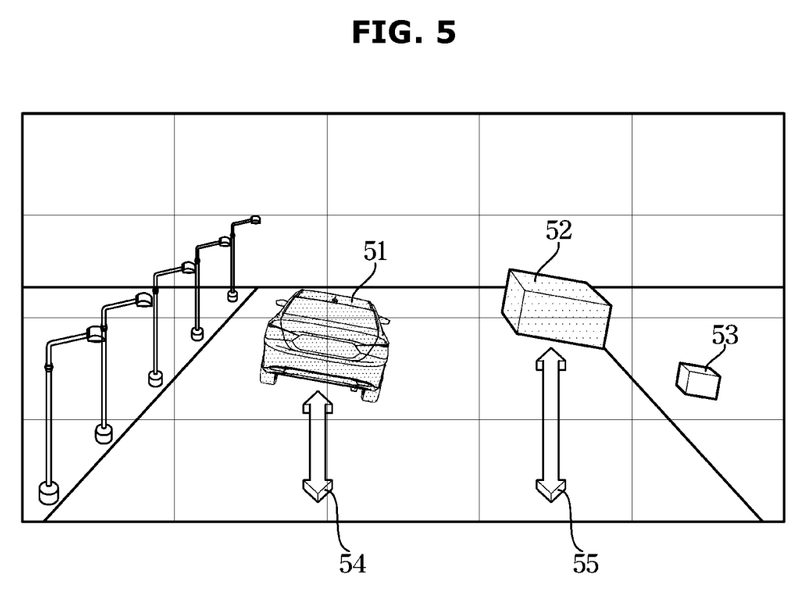
FIG. 5 is the first conceptual diagram illustrating an example for explaining image processing of the processor for objects in a short distance of the vehicle according to an embodiment.

FIG. 5 is the first conceptual diagram illustrating an example for explaining image processing of the processor 120 for objects in a short distance of the vehicle 100 according to an embodiment.

The processor 120 may identify objects having a size larger than or equal to the predetermined size among the objects included in the image data based on the image data captured by the camera 110. Also, the processor 120 may identify an object when the distance between the vehicle 100 and the object is closer than the reference distance. The processor 120 may identify an object by at least one of the identification of an object when the distance between the vehicle 100 and the object included in image data is less than the reference distance and the identification of an object when the size of the object included in the image data is larger than or equal to the predetermined size.

As illustrated in FIG. 5, the processor 120 may identify a first object 51 and a second object 52 corresponding to the predetermined size or more among the first object 51, the second object 52, and a third object 53 that are included in the image data. The determined size may refer to, for example, a reference value for an area (size, etc.) occupied by an object in image data, and may be for reliability of object recognition. For example, the predetermined size may be a size sufficient to calculate a straight line component of an object perpendicular to the ground in order to calculate an inclination of the vehicle 100 in a front transverse direction, which will be described later, but it is not limited thereto.

The processor 120 may identify an object when the distance between the vehicle 100 and the object is closer than the reference distance. As illustrated in FIG. 5, for example, because a distance 54 between the first object 51 and the vehicle 100 and a distance 55 between the second object 52 and the vehicle 100 are closer than the reference distance, the processor 120 may identify the first object 51 and the second object 52.

When the processor 120 identifies an object at a distance closer than the reference distance, for example, when the processor 120 identifies an object at a long distance, the processor 120 calculates an inclination of the current road in the transverse direction, so that noise is generated when an inclination of a front road in the transverse direction is calculated.

Accordingly, the criterion of the reference distance identified by the processor 120 may be, for example, an arbitrary distance set so that the processor 120 may not identify a vehicle existing in a long distance. However, the disclosure is not limited thereto.

Figure 6:
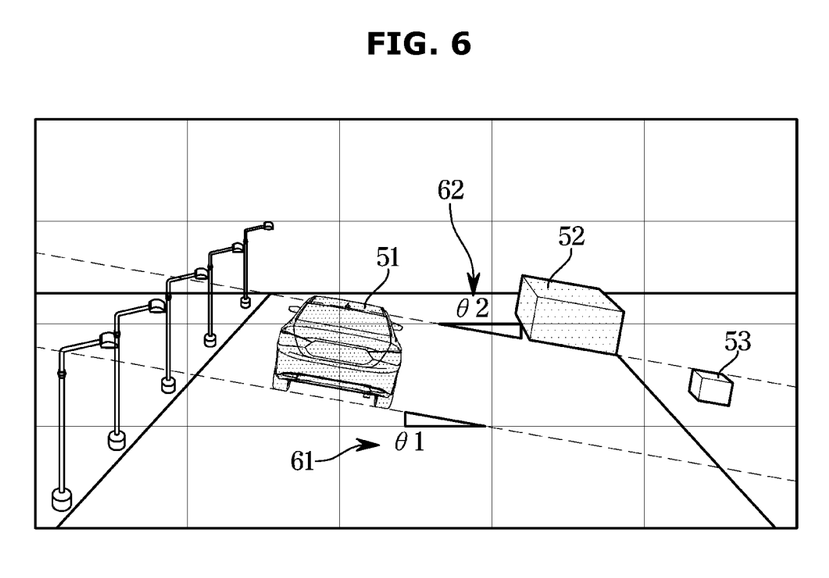
FIG. 6 is the second conceptual diagram illustrating an example for explaining image processing of the processor for the objects in the short distance of the vehicle according to an embodiment.

FIG. 6 is the second conceptual diagram illustrating an example for explaining image processing of the processor 120 for the objects in the short distance of the vehicle 100 according to an embodiment.

The processor 120 may identify an inclination of a front road in the transverse direction based on the identified object. More specifically, the processor 120 may extract a straight line element from the identified object. Also, the processor 120 may calculate an angle between the straight line element of the identified object and a vertical or horizontal element of the reference coordinate system of the image data. The calculated angle may be, for example, a degree of inclination (angle) of the front road in the transverse direction.

As illustrated in FIG. 6, for example, when the processor 120 identifies the first object 51 and the second object 52 based on the image data, the processor 120 may calculate an angle Θ1 between the horizontal element of the reference coordinate system of the image data and a straight line element of the first object 51 and an angle 73 2 between the horizontal element of the reference coordinate system of the image data and a straight line element of the second object 52. The respective angles Θ1 and Θ2 may be the same, but an error may occur depending on the clarity of the image data, the shaking of the vehicle 100, and the like.

Accordingly, in order to improve reliability and stability for inclination in the front transverse direction, the processor 120 may identify the inclination in the front transverse direction by imparting a weight depending on a size of the identified reference object.

The processor 120 according to an embodiment may identify the inclination in the front transverse direction through Equation 3 below.

$$\theta_{Total} = \frac{\theta_1 C_1 + \theta_2 C_2 + \theta_3 C_3 + \ldots + \theta_n C_n}{C_1 + C_2 + C_3 + \ldots + C_n} \qquad \text{Equation 3}$$

The sign $\Theta_{total}$ in Equation 3 is the inclination of the front road in the transverse direction that is finally identified (calculated, etc.), $\Theta_n$ is an inclination in the front transverse direction calculated in an n-th object, and $C_n$ may be a weight imparted to the n-th object.

More specifically, as illustrated in FIG. 6, because the first object 51, which is an object identified by the processor 120, has the largest size among the objects 51, 52, and 53 included in the image data, a weight of C1 may be imparted to the first object 51, and a weight of C2 may be imparted to the second object 52. Herein, because when the first object 51 and the second object 52 are enumerated in the order of having a large area among the image data, it may be enumerated as the order of the first object 51 and the second object 52, it may be understood that a magnitude of the weight is imparted as C1>C2. In this case, the calculated inclination in the front transverse direction may be $$\frac{\theta_1 C_1 + \theta_2 C_2}{C_1 + C_2}.$$

However, the disclosure is not limited thereto.

The processor 120 may control the steering device 130 based on the identified inclination in the front transverse direction. More specifically, the processor 120 generates an expected compensation torque based on the inclination of the front road in the transverse direction with respect to a final steering torque of the steering device 130 including the driver assistance system including the road departure prevention assistance function or the road maintenance assistance function of the vehicle 100, generates a control signal for the torque, and transmits the control signal to the steering device 130, so that a phenomenon in which the vehicle 100 is leaned due to the inclination in the front transverse direction may be prevented or improved. However, the disclosure is not limited thereto.

As another embodiment, because an inclination of a road in the transverse direction causes the leaning phenomenon of the vehicle 100 in the driving of the vehicle 100, even when the vehicle 100 does not activate the road departure prevention assist function or the road maintenance assist function, the processor 120 may control the steering device 130 to compensate for the leaning phenomenon of the vehicle 100.

For reliability and stability of the expected compensation torque when the number of objects identified from the image data is small, the processor 120 according to an embodiment may vary a degree of the expected compensation torque included in the control signal of the steering device 130 depending on the sum of weights imparted depending on the size of the identified object.

That is, the smaller the number of objects identified by the processor 120 from the image data and the smaller the size of the objects, the reliability and stability for the calculated inclination in the front transverse direction are lower than when the number of objects is large or the size of objects is large. Therefore, in order to secure the reliability and stability, the processor 120 may control the steering device 130 to vary a degree of compensating for the inclination in the front transverse direction based on the sum of the weights imparted to the identified objects.

For example, because the processor 120 does not impart a weight when an object identified by the processor 120 from the image data does not exist, there may be no expected compensation torque for the steering device 130. However, the disclosure s not limited thereto.

As another embodiment, when the compensation torque depending on the inclination in the front transverse direction identified by the processor 120 is Fb and the sum of the weights imparted to the identified objects is greater than a preset value, the processor 120 may control the steering device 130 to fully apply all of the expected compensation torques Gb.

In addition, when the expected compensation torque depending on the inclination in the transverse direction identified by the processor 120 according to an embodiment is Gb, and when the sum of the weights imparted to the identified objects is less than the preset value but greater than 0, the processor 120 may calculate a compensation torque to be applied as shown in Equation 4 below.

$$Fb(c) = p*Gb*\frac{C_{total}}{K}. \qquad \text{Equation 4}$$

The sign Fb(c) in Equation 4 is a final expected compensation torque, p is a proportionality constant, Gb is the expected compensation torque calculated based on the inclination of the identified (calculated, etc.) front road in the transverse direction, $C_{total}$ is the sum of the weights, and K may be a preset value.

When the sum of the weights imparted to the identified objects is smaller than the preset value, the processor 120 may vary the magnitude of the expected torque compensated for the steering device 130 depending on the sum of the weights.

The processor 120 according to an embodiment may control the steering device 130 based on the final compensation torque Fa calculated based on the long-distance object and the final expected compensation torque Fb calculated based on the short-distance object. More specifically, the compensation torque for a steering signal of the steering device 130 may be determined based on an average value of the final expected compensation torque Fb calculated for future time t2 at time t1 and the final compensation torque Fa calculated at time t2. However, the disclosure is not limited thereto.

The processor 120 may control the steering device 130 to compensate for the inclination of the road in the transverse direction based on the acceleration information received from the acceleration sensor 140, which will be described later, and the identified inclination in the transverse direction. However, because the reliability of the acceleration information is sharply lowered when the vehicle 100 travels on a curved road, it is preferable that this is applied when traveling on a straight road.

That is, the processor 120 controls the steering device 130 to compensate for the inclination in the transverse direction based on the acceleration in the transverse direction calculated by the identified inclination in the transverse direction with respect to the road, and in this case, the processor 120 may calculate the final acceleration in the transverse direction based on an average value of the acceleration in the transverse direction calculated by the inclination identified in the transverse direction and the acceleration in the transverse direction of the acceleration information received from the acceleration sensor 140, and may control the steering device 130 to compensate for the leaning of the vehicle 100 based on the final acceleration in the transverse direction. However, the disclosure is not limited thereto.

As another embodiment, the processor 120 may control the steering device 130 to compensate for the leaning based on the inclination of the identified road in the transverse direction, the expected inclination of the road in the transverse direction, and the acceleration information.

The processor 120 may provide a function of assisting the steering device 130 when the driver drives the vehicle 100, such as, for example, lane keeping assist (LKA) and road following assist (LFA). The lane departure prevention assistance and road maintenance assistance functions may be auxiliary functions capable of automatically steering the steering wheel included in the vehicle 100.

Even when the system for assisting the steering of the vehicle 100, such as the lane departure prevention assistance and road maintenance assistance functions described above, is activated, the processor 120 may compensate for the torque output by the steering device 130 based on the inclination of the road in the transverse direction.

For example, in order to move away from the right lane when the vehicle 100 goes to the right of the road in the transverse direction, the steering device 130 may provide a torque to direct an advancing direction of the vehicle 100 to the left. At this time, when the inclination of the vehicle 100 in the transverse direction is inclined to the left so that the leaning phenomenon occurs, the processor 120 may compensate for the torque of the steering device 130 in order to prevent the vehicle 100 from moving more to the left due to the leaning to the left. However, the disclosure is not limited thereto.

Hereinafter, a device for assisting a driver will be described based on the details described above.

The device for assisting a driver may include a camera installed in a vehicle to have a front view of the vehicle and obtain image data, and a processor processing the image data, the processor may identify whether a road is inclined in the transverse direction based on the processing of the image data, and may control the steering device to compensate for the inclination in the transverse direction based on the identification of the inclination in the transverse direction.

Hereinafter, an operation of a vehicle according to an embodiment will be briefly described based on the details described above.

Figure 7:
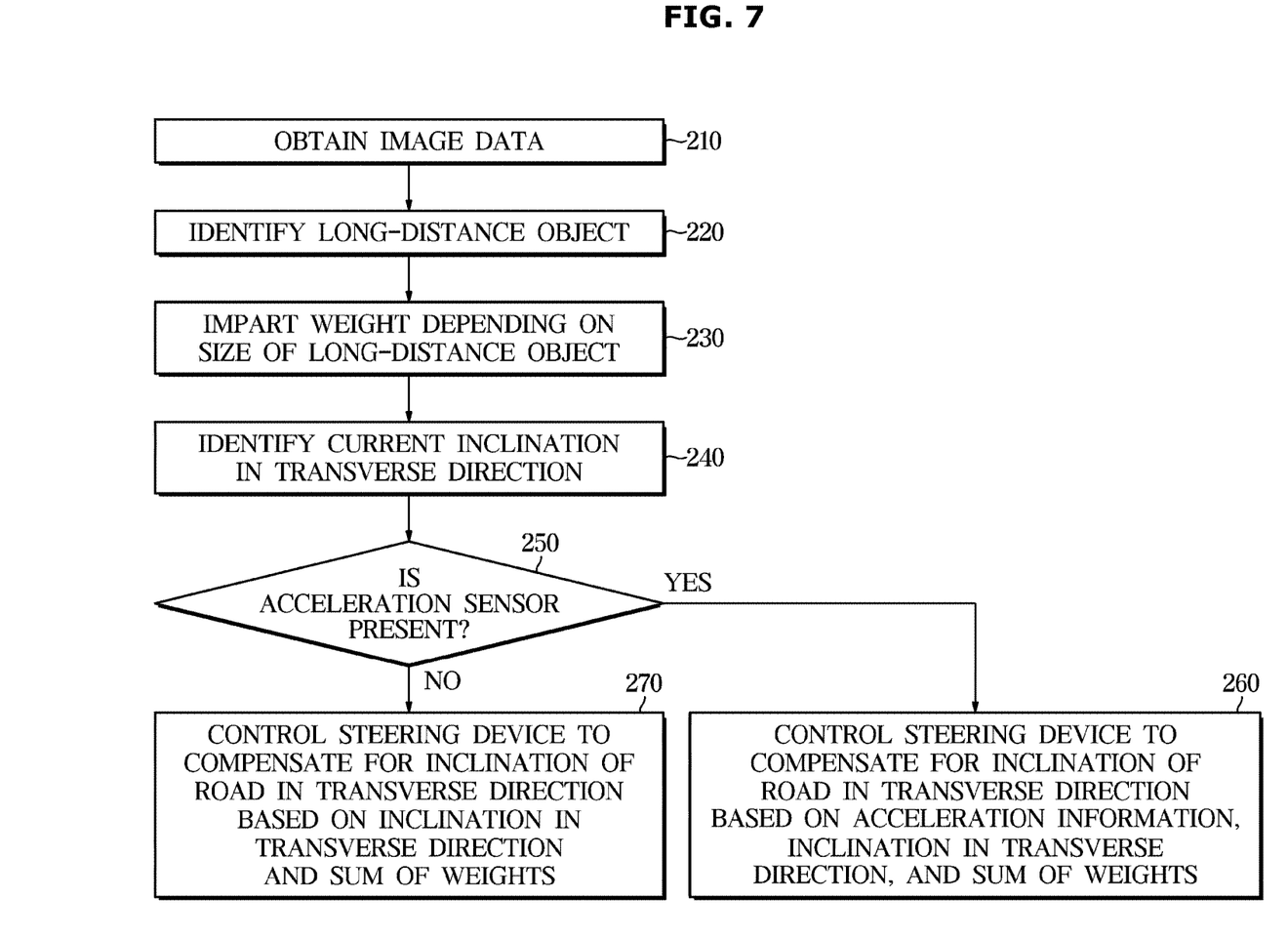
FIG. 7 is a flowchart illustrating an example of a vehicle control method for a long-distance object according to an embodiment.
Figure 8:
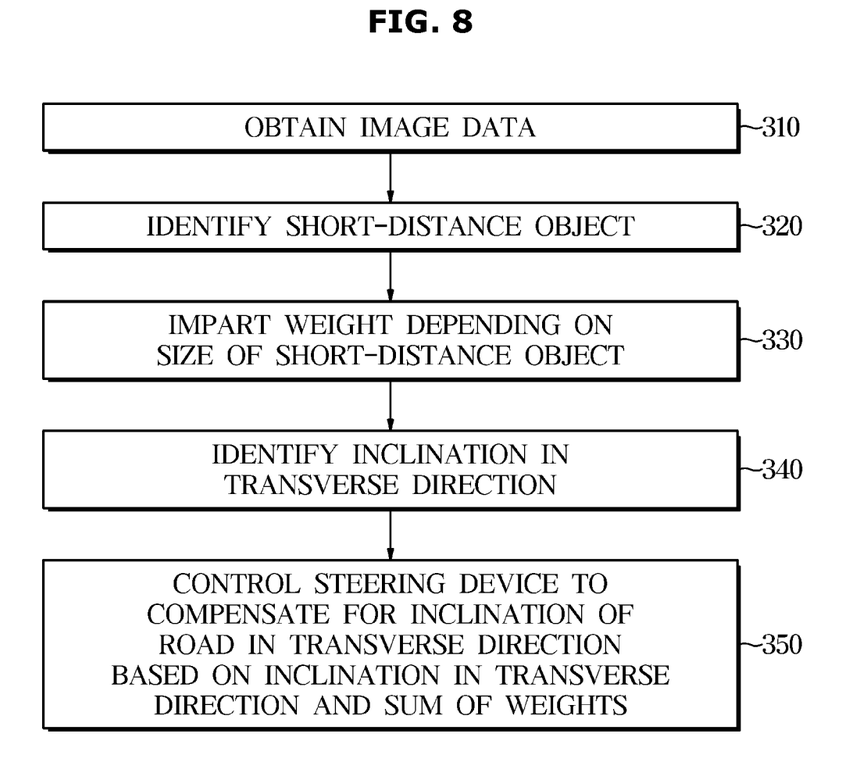
FIG. 8 is a flowchart illustrating an example of a vehicle control method for a short-distance object according to an embodiment.

FIG. 7 is a flowchart illustrating an example of a vehicle control method for a long-distance object according to an embodiment, and FIG. 8 is a flowchart illustrating an example of a vehicle control method for a short-distance object according to an embodiment.

A vehicle control method illustrated in FIGS. 7 and 8 may be performed by the vehicle 100 described above. Therefore, even if there are the contents omitted below, the contents described about the vehicle 100 may be equally applied to the vehicle control method.

Referring to FIG. 7, the vehicle 100 may obtain image data by the camera installed in the vehicle 100 to have a front view of the vehicle 100 (210).

The vehicle 100 may identify an object when the distance between the vehicle 100 and the object is farther than the reference distance based on the image data. In this case, step 220 may be to identify an object having a size larger than or equal to the predetermined size (220).

The vehicle 100 may impart a weight depending on the size of the identified long-distance object (230).

The vehicle 100 may identify an inclination of a road in the transverse direction based on the weight imparted to the identified object (240).

The vehicle 100 may determine the presence or absence of the acceleration sensor 140 of the vehicle 100 (250).

When the acceleration sensor 140 is included in the vehicle 100 (YES to 250), the vehicle 100 may receive acceleration information from the acceleration sensor 140, and may control the steering device 130 to compensate for the inclination of the road in the transverse direction based on the acceleration information, the inclination in the transverse direction, and the sum of the weights (260).

When the acceleration sensor 140 is not included in the vehicle 100 (NO to 250), the vehicle 100 may control the steering device 130 to compensate for the inclination of the road in the transverse direction based on the inclination in the transverse direction and the sum of the weights (270).

Referring to FIG. 8, the vehicle 100 may acquire image data by the camera installed in the vehicle 100 to have a front view of the vehicle 100 (310).

The vehicle 100 may identify an object when the distance between the vehicle 100 and the object is closer than the reference distance based on the image data (320). In this case, step 320 may be to identify an object having a size larger than or equal to the predetermined size.

The vehicle 100 may impart a weight depending on the size of the identified short-distance object (330).

The vehicle 100 may identify an inclination of a road in the transverse direction based on the weight imparted to the identified object (340).

The vehicle 100 may control the steering device 130 to compensate for the inclination of the road in the transverse direction based on the inclination in the transverse direction and the sum of the weights (350).

In the above description, steps 210 to 270 or steps 310 to 350 may be further divided into additional steps or may be combined into fewer steps, depending on an implementation of the disclosure. In addition, some steps may be omitted as necessary, and the order between steps may be changed.

Herein the disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes various kinds of recording media which instructions which may be decrypted by a computer are stored. For example, there may be a ROM (read only memory), a RAM (random access memory), a magnetic tape, a magnetic disk, a flash memory, an optical data storage device, and the like.

As is apparent from the above, according to one embodiment of the disclosure, a vehicle capable of improving a leaning phenomenon caused by an inclination of a road in a transverse direction and a control method thereof can be provided.

In addition, the vehicle and the control method thereof according to an embodiment of the disclosure can predict and improve the leaning phenomenon caused by an inclination of a front road in the transverse direction.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A vehicle comprising:
    a camera installed in the vehicle to have a front view of the vehicle;
    a steering device; and
    a processor configured to determine whether a road has an inclination in a transverse direction based on image data obtained by the camera and to control the steering device to compensate for the inclination of the road in the transverse direction in response to a determination that the road has the inclination in the transverse direction,
    wherein the processor is further configured to, when a distance between the vehicle and an object is farther than a reference distance, identify the object larger than or equal to a predetermined size based on the image data and to determine whether the road has the inclination in the transverse direction based on identification of the object.

2. The vehicle according to claim 1, wherein the processor is configured to:
    determine an initial inclination in the transverse direction based on the object; and
    impart a weight to the initial inclination in the transverse direction depending on a size of the object and determine a finally identified inclination of the road in the transverse direction based on the weight and the initial inclination in the transverse direction.

3. The vehicle according to claim 2, further comprising a second camera installed in the vehicle to have a rear view of the vehicle.

4. The vehicle according to claim 1, wherein the processor is configured to:
identify a plurality of objects;
determine initial inclinations in the transverse direction based on each of the plurality of objects; and
impart weights to the initial inclinations in the transverse direction depending on a size of each of the plurality of objects and determine a final inclination of the road in the transverse direction based on the weights and the initial inclinations in the transverse direction.

5. The vehicle according to claim 4, wherein the processor is configured to control the steering device to vary a degree of compensating for the final inclination of the road in the transverse direction based on a sum of the weights imparted to the plurality of objects.

6. The vehicle according to claim 4, further comprising a second camera installed in the vehicle to have a rear view of the vehicle.

7. The vehicle according to claim 1, wherein the processor is configured to identify the object in response to the distance between the vehicle and the object being closer than the reference distance.

8. The vehicle according to claim 7, further comprising a second camera installed in the vehicle to have a rear view of the vehicle.

9. The vehicle according to claim 1, further comprising a second camera installed in the vehicle to have a rear view of the vehicle.

10. The vehicle according to claim 1, further comprising a sensor installed in the vehicle, wherein the processor is configured to control the steering device to compensate for the inclination of the road in the transverse direction based on acceleration information of the sensor and the inclination of the road in the transverse direction.

11. A control method of a vehicle, the control method comprising:
obtaining image data by a camera installed in the vehicle to have a front view or a rear view of the vehicle;
determining that a road has an inclination in a transverse direction based on the image data; and
controlling a steering device to compensate for the inclination of the road in the transverse direction;
wherein determining that the road has the inclination in the transverse direction comprises:
when a distance between the vehicle and an object is farther than a reference distance, identifying the object having a size larger than or equal to a predetermined size based on the image data; and
determining the road has the inclination in the transverse direction based on the object.

12. The control method according to claim 11, wherein determining the road has the inclination in the transverse direction comprises:
determining an initial inclination of the road in the transverse direction based on the object;
imparting a weight to the initial inclination of the road in the transverse direction based on the size of the object; and
identifying a final inclination of the road in the transverse direction based on the weight and the initial inclination of the road in the transverse direction.

13. The control method according to claim 11, further comprising:
identifying a plurality of objects;
determining initial inclinations of the road in the transverse direction based on each of the plurality of objects;
imparting weights to the initial inclination of the road in the transverse direction based on the size of each of the plurality of objects; and
determining a final inclinations of the road in the transverse direction based on the weights and the initial inclinations in the transverse direction.

14. The control method according to claim 13, wherein controlling the steering device comprises controlling the steering device to vary a degree of compensating for the final inclination of the road in the transverse direction based on a sum of the weights imparted to the plurality of objects.

15. The control method according to claim 11, wherein determining the road has the inclination in the transverse direction further comprises identifying the object in response to the distance between the vehicle and the object being closer than the reference distance.

16. The control method according to claim 11, wherein the camera is installed to have the front view of the vehicle, and a second camera is installed to have the rear view of the vehicle.

17. The control method according to claim 11, further comprising generating acceleration information by a sensor installed in the vehicle.

18. The control method according to claim 17, wherein controlling the steering device comprises controlling the steering device to compensate for the inclination of the road in the transverse direction based on the acceleration information and the inclination in the transverse direction.

19. A non-transitory computer-readable recording medium in which a program capable of executing the control method of the vehicle according to claim 11 is recorded.

20. A driver assistance device comprising:
a camera installed in a vehicle to have a front view or a rear view of the vehicle; and
a processor configured to:
process image data obtained by the camera;
determine whether a road has an inclination in a transverse direction based on the image data; and
control a steering device to compensate for the inclination in the transverse direction in response to a determination that the road has the inclination in the transverse direction,
wherein the processor is further configured to, when a distance between the vehicle and an object is farther than a reference distance, identify the object larger than or equal to a predetermined size based on the image data and to determine whether the road has the inclination in the transverse direction based on identification of the object.

* * * * *

UNITED STATES PATENT AND TRADEMARK OFFICE
CERTIFICATE OF CORRECTION

| | |
|---|---|
| PATENT NO. | : 12,134,433 B2 |
| APPLICATION NO. | : 17/857463 |
| DATED | : November 5, 2024 |
| INVENTOR(S) | : Sung et al. |

It is certified that error appears in the above-identified patent and that said Letters Patent is hereby corrected as shown below:

In the Claims

In Column 16, in Claim 13, Line 9, delete "inclination" and insert -- inclinations --.

In Column 16, in Claim 13, Line 12, delete "inclinations" and insert -- inclination --.

Signed and Sealed this
Tenth Day of December, 2024

Katherine Kelly Vidal
*Director of the United States Patent and Trademark Office*